US006716919B2

(12) United States Patent
Lichtenhan et al.

(10) Patent No.: US 6,716,919 B2
(45) Date of Patent: Apr. 6, 2004

(54) NANOSTRUCTURED CHEMICALS AS ALLOYING AGENTS IN POLYMERS

(75) Inventors: Joseph D. Lichtenhan, San Juan Capistrano, CA (US); Joseph J. Schwab, Huntington Beach, CA (US); Andre Lee, Novi, MI (US); Shawn Phillips, Lancaster, CA (US)

(73) Assignee: Hybrid Plastics, Fountain Valley, CA (US)

( * ) Notice: Subject to any disclaimer, the term of this patent is extended or adjusted under 35 U.S.C. 154(b) by 0 days.

(21) Appl. No.: 09/818,265

(22) Filed: Mar. 26, 2001

(65) Prior Publication Data

US 2002/0052434 A1 May 2, 2002

Related U.S. Application Data

(60) Provisional application No. 60/192,083, filed on Mar. 24, 2000.

(51) Int. Cl.[7] .................................................. C08F 8/00

(52) U.S. Cl. ........................ 525/101; 525/106; 525/431; 525/446; 525/464; 525/484

(58) Field of Search ................................ 525/101, 106, 525/431, 446, 464, 484

(56) References Cited

U.S. PATENT DOCUMENTS

| 5,412,053 A | 5/1995 | Lichtenhan et al. ............ 528/9 |
| 5,484,867 A | 1/1996 | Lichtenhan et al. ............ 528/9 |
| 5,589,562 A | 12/1996 | Lichtenhan et al. ............ 528/9 |
| 5,939,576 A | 8/1999 | Lichtenhan et al. ......... 556/460 |
| 5,942,638 A | 8/1999 | Lichtenhan et al. ......... 556/640 |
| 6,075,068 A | 6/2000 | Bissinger ..................... 523/116 |
| 6,100,417 A | 8/2000 | Lichtenhan et al. ......... 556/460 |
| 6,228,904 B1 | 5/2001 | Yadav et al. ................. 523/210 |
| 6,245,849 B1 | 6/2001 | Morales et al. .............. 524/442 |

*Primary Examiner*—Bernard Lipman
(74) *Attorney, Agent, or Firm*—David Jaffer; Pillsbury Winthrop LLP

(57) ABSTRACT

A method of using nanostructured chemicals as alloying agents for the reinforcement of polymer microstructures, including polymer coils, domains, chains, and segments, at the molecular level. Because of their tailorable compatibility with polymers, nanostructured chemicals can be readily and selectively incorporated into polymers by direct blending processes. The incorporation of a nanostructured chemical into a polymer favorably impacts a multitude of polymer physical properties. Properties most favorably improved are time dependent mechanical and thermal properties such as heat distortion, creep, compression set, shrinkage, modulus, hardness and abrasion resistance. In addition to mechanical properties, other physical properties are favorably improved, including lower thermal conductivity, fire resistance, and improved oxygen permeability.

9 Claims, 5 Drawing Sheets

NANOSTRUCTURED CHEMICALS AS ALLOYING AGENTS IN POLYMERS

CROSS-REFERENCE TO RELATED APPLICATIONS

This application claims the benefit of U.S. Provisional Application No. 60/192,083 filed on Mar. 24, 2000.

FIELD OF THE INVENTION

This invention relates generally to methods for enhancing the properties of a polymer and, more particularly, to methods for compounding a nanostructured chemical into a polymer.

BACKGROUND OF THE INVENTION

It has long been recognized that the morphology of polymers can be controlled to a high degree through variables such as composition, thermodynamics and processing conditions. (F. W. Billmeyer, Jr., *Textbook of Polymer Science* $3^{rd}$ *Edition*, Wiley & Sons, New York, 1984.) It is similarly known that various sizes and shapes of fillers (e.g. calcium carbonate, silica, carbon black etc.) can be inserted or compounded into a polymer to somewhat control both polymer morphology and the resulting physical properties.

In their solid state all polymers (including amorphous, semi-crystalline, crystalline, and rubber, etc.) possess considerable amounts of internal and external free volume (see FIG. 1). The free volume of a polymer has a tremendous impact on its physical properties, since it is within this volume that the dynamic properties (e.g. reptation, translation, rotation, crystallization) of polymer chains primarily operate and in turn influence fundamental physical properties such as density, thermal conductivity, glass transition, melt transition, modulus, relaxation, and stress transfer.

The accessibility of free volume in a polymer system depends greatly on its morphology. As shown in FIG. 2, for example, denser regions and phase separation within a polymer can both increase and decrease the thermodynamic and kinetic access to such areas. Because of its influence on thermodynamic and kinetic properties, polymer morphology is a major factor that limits the ability of conventional fillers from accessing the free volume regions in a polymer system. Additional processing/compounding effort is normally required to force compatibilization between a filler and a polymer system because conventional fillers are physically larger than most polymer dimensions, are chemically dissimilar, and usually are high melting solids.

Prior art in compounding has focussed on incorporating polymer systems with small, low molecular weight molecules (liquids and solids) known as plasticizers or plasticizing agents and with macro, micro and nanoscale particulates of dissimilar composition (e.g. inorganic) to that of the polymer (organic). The function of a plasticizing agent is to aid in the slippage of polymer chains by one another, thus improving the processability and manufacturability of a particular polymer system. Similarly fillers, which have traditionally been composed of fibrous or particulate solids, have been combined with polymers to enhance physical properties such as dimensional stability, impact resistance, tensile and compressive strengths, and thermal stability. (F. W. Billmeyer, Jr., *Textbook of Polymer Science* $3^{rd}$ *Edition*, Wiley & Sons, New York, 1984, Chapter 6, pp 471–472). Unfortunately, where plasticizers are too small to reinforce polymer chains, traditional fillers are too large to reinforce individual polymer chains and segments. As illustrated in FIG. 4, fillers are traditionally utilized to macroscopically reinforce large associated or nearby groups of polymers rather than the individual chains and segments within these polymers.

Nevertheless, it has been calculated that as filler sizes decrease below 50 nm, they would become more resistant to sedimentation and more effective at providing reinforcement to polymer systems. (G. Wypych, *Fillers*, ChemTech Publishing, Canada, 1993.) The full application of this theoretical knowledge, however, has been thwarted by the lack of a practical source of particulates with monodispersity and diameters below the 50 nm range and especially at or below the 10 nm range. Particularly desirable are particles that are monodisperse or which have controlled and narrow particle size distributions as these are expected to form the most stable dispersions within polymer systems. In addition, these particles would be well below the length scale necessary to scatter light and hence should appear transparent when compounded into plastics.

Recent developments in nanoscience have now enabled the ability to cost effectively manufacture commercial quantities of materials that are best described as nanostructured chemicals due to their specific and precise chemical formula, hybrid (inorganic-organic) chemical composition, and large physical size relative to the size of traditional chemical molecules (0.3–0.5 nm) and relative to larger sized traditional fillers (>50 nm).

Nanostructured chemicals are best exemplified by those based on low-cost Polyhedral Oligomeric Silsesquioxanes (POSS) and Polyhedral Oligomeric Silicates (POS). FIG. 3 illustrates some representative examples of monodisperse nanostructured chemicals, which are also known as POSS Molecular Silicas.

These systems contain hybrid (i.e., organic-inorganic) compositions in which the internal frameworks are primarily comprised of inorganic silicon-oxygen bonds. The exterior of a nanostructure is covered by both reactive and nonreactive organic functionalities (R), which ensure compatibility and tailorability of the nanostructure with organic polymers. These and other properties of nanostructured chemicals are discussed in detail in U.S. Pat. No. 5,412,053 to Lichtenhan et al., and U.S. Pat. No. 5,484,867 to Lichtenhan et al., both are expressly incorporated herein by reference in their entirety. These nanostructured chemicals are of low density, exhibit excellent inherent fire retardancy, and can range in diameter from 0.5 nm to 50 nm.

Prior art associated with fillers, plasticizers, and polymer morphology has not been able to adequately control polymer chain, coil and segmental motion at a molecular level. Furthermore, the mismatch of chemical potential (e.g., solubility, miscibility, etc.) between hydrocarbon-based polymers and inorganic-based fillers resulted in a high level of heterogeneity in compounded polymers that is akin to oil mixed with water. Therefore, there exists a need for appropriately sized reinforcements for polymer systems with controlled diameters, (nanodimensions), distributions and with tailorable chemical functionality. In addition, it would be desirous to have easily compoundable nanoreinforcements that have chemical potential (misibilities) ranges similar to the various polymer systems.

SUMMARY OF THE INVENTION

The present invention describes methods of preparing new polymer compositions by compounding nanostructured chemicals into polymers. The resulting nano-alloyed polymers are wholly useful by themselves or in combination with other polymers or in combination with macroscopic reinforcements such as fiber, clay, glass mineral and other fillers. The nano-alloyed polymers are particularly useful for producing polymeric compositions with desirable physical properties such as adhesion to polymeric, composite and metal surfaces, water repellency, reduced melt viscosity, low dielectric constant, resistance to abrasion and fire, biological compatibility, and optical quality plastics. The preferred compositions presented herein contain two primary material combinations: (1) nanostructured chemicals, nanostructured oligomers, or nanostructured polymers from the chemical classes of polyhedral oligomeric silsesquioxanes, polyhedral oligomeric silicates, polyoxometallates, carboranes, boranes, and polymorphs of carbon; and (2) traditional amorphous polymer systems such as: acrylics, carbonates, epoxies, esters, silicones, etc. or traditional semicrystalline and crystalline polymer systems such as: styrenics, amides, nitrites, olefins, aromatic oxides, aromatic sulfides, esters etc. or ionomers or traditional rubbery polymer systems as derived from hydrocarbons and silicones.

Preferably, the compounding of nanostructured chemicals into polymers is accomplished via blending of the chemicals into the polymers. All types and techniques of blending, including melt blending, dry blending, and solution blending are effective.

In addition, selective incorporation of a nanostructured chemical into a specific region of a polymer can be accomplished by compounding into the polymer a nanostructured chemical with a chemical potential (miscibility) compatible with the chemical potential of the region within the polymer to be alloyed. Because of their chemical nature, nanostructured chemicals can be tailored to show compatibility or incompatibility with nearly all polymer systems. Their physical size in combination with their tailorable compatibility enables nanostructured chemicals to be selectively incorporated into plastics and control the dynamics of coils, blocks, domains, and segments, and subsequently favorably impact a multitude of physical properties. Properties most favorably improved are time dependent mechanical and thermal properties such as heat distortion, creep, compression set, shrinkage, modulus, hardness and abrasion resistance. In addition to mechanical properties, other physical properties are favorably improved, including lower thermal conductivity, improved fire resistance, and improved oxygen permeability.

DEFINITION OF FORMULA REPRESENTATIONS FOR NANOSTRUCTURES

Figure 1:
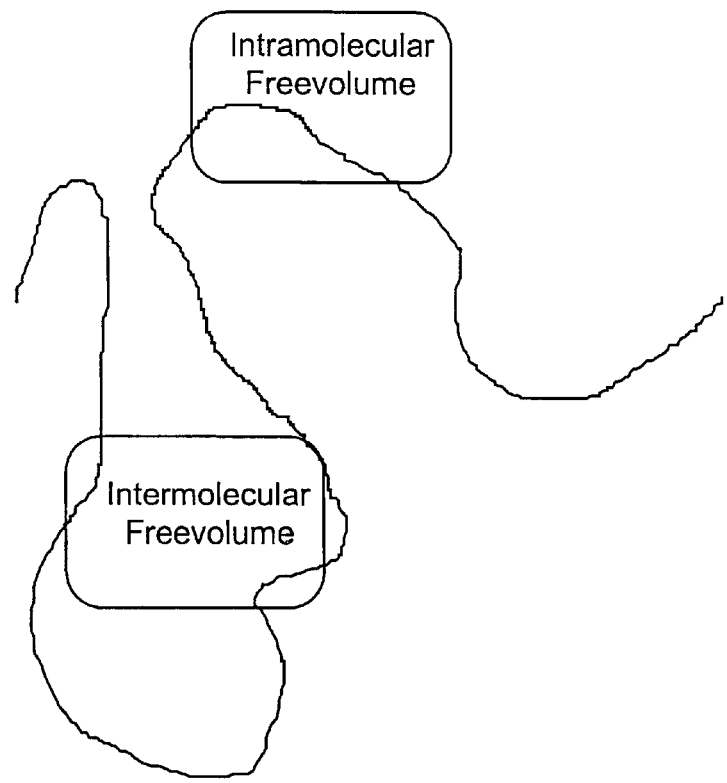
FIG. 1 shows the relative positions of an internal free volume and an external free volume of a polymer.
Figure 2:
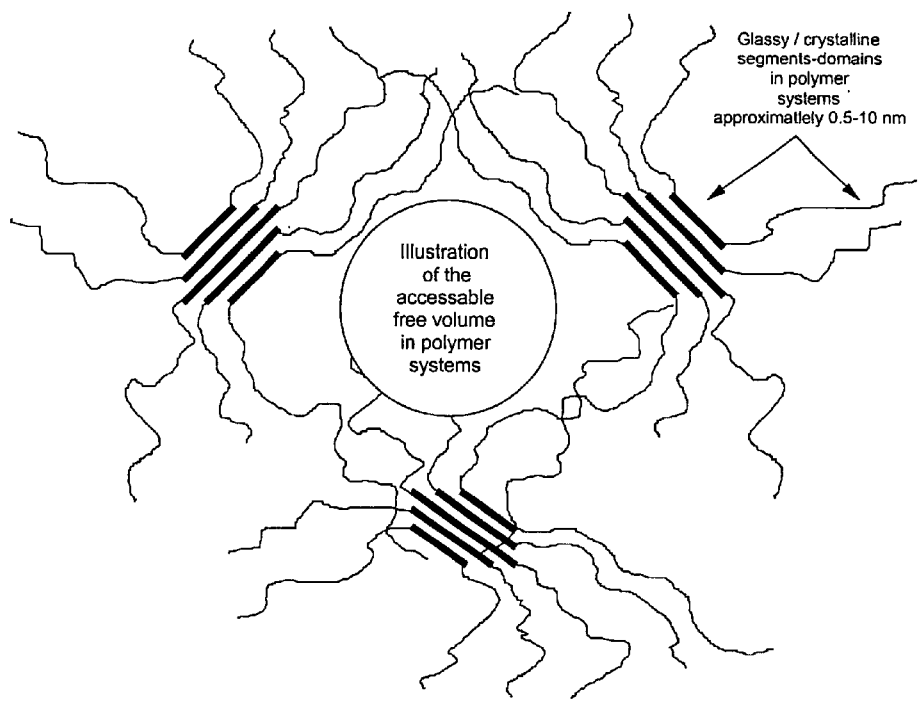
FIG. 2 illustrates some different regions and phase separation within a polymer.

For the purposes of understanding this invention's chemical compositions the following definition for formula representations of Polyhedral Oligomeric Silsesquioxane (POSS) and Polyhedral Oligomeric Silicate (POS) nanostructures is made.

Polysilsesquioxanes are materials represented by the formula $[RSiO_{1.5}]_\infty$ where $\infty$ represents molar degree of polymerization and R=represents organic substituent (H, siloxy, cyclic or linear aliphatic or aromatic groups that may additionally contain reactive functionalities such as alcohols, esters, amines, ketones, olefins, ethers or halides). Polysilsesquioxanes may be either homoleptic or heteroleptic. Homoleptic systems contain only one type of R group while heteroleptic systems contain more than one type of R group.

POSS and POS nanostructure compositions are represented by the formula:

$[(RSiO_{1.5})_n]_{\Sigma\#}$ for homoleptic compositions $[(RSiO_{1.5})_n(R'SiO_{1.5})_m]_{\Sigma\#}$ for heteroleptic compositions (where R≠R')

$[(RSiO_{1.5})_n(RXSiO_{1.0})_m]_{\Sigma\#}$ for functionalized heteroleptic compositions (where R groups can be equivalent or inequivalent)

In all of the above R is the same as defined above and X includes but is not limited to OH, Cl, Br, I, alkoxide (OR), acetate (OOCR), peroxide (OOR), amine (NR$_2$) isocyanate (NCO), and R. The symbols m and n refer to the stoichiometry of the composition. The symbol $\Sigma$ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that $\Sigma\#$ is not to be confused as a multiplier for determining stoichiometry, as it merely describes the overall nanostructural characteristics of the system (aka cage size).

DETAILED DESCRIPTION OF THE INVENTION

The present invention teaches the use of nanostructured chemicals as alloying agents for the reinforcement of polymer coils, domains, chains, and segments at the molecular level.

The keys that enable nanostructured chemicals to function as molecular level reinforcing and alloying agents are: (1) their unique size with respect to polymer chain dimensions, and (2) their ability to be compatibilized with polymer systems to overcome repulsive forces that promote incompatibility and expulsion of the nanoreinforcing agent by the polymer chains. That is, nanostructured chemicals can be tailored to exhibit preferential affinity/compatibility with some polymer microstructures through variation of the R groups on each nanostructure. At the same time, the nanostructured chemicals can be tailored to be incompatible with other microstructures within the same polymer, thus allowing for selective reinforcement of specific polymer microstructure. Therefore, the factors to effect a selective nanoreinforcement include specific nanosizes of nanostructured chemicals, distributions of nanosizes, and compatabilities and disparities between the nanostrucutured chemical and the polymer system.

Figure 3:
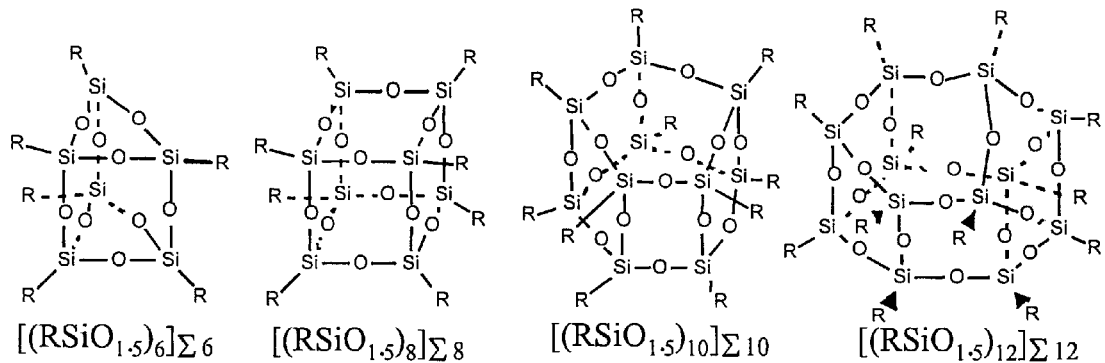
FIG. 3 illustrates some representative examples of monodisperse nanostructured chemicals.
Figure 4:
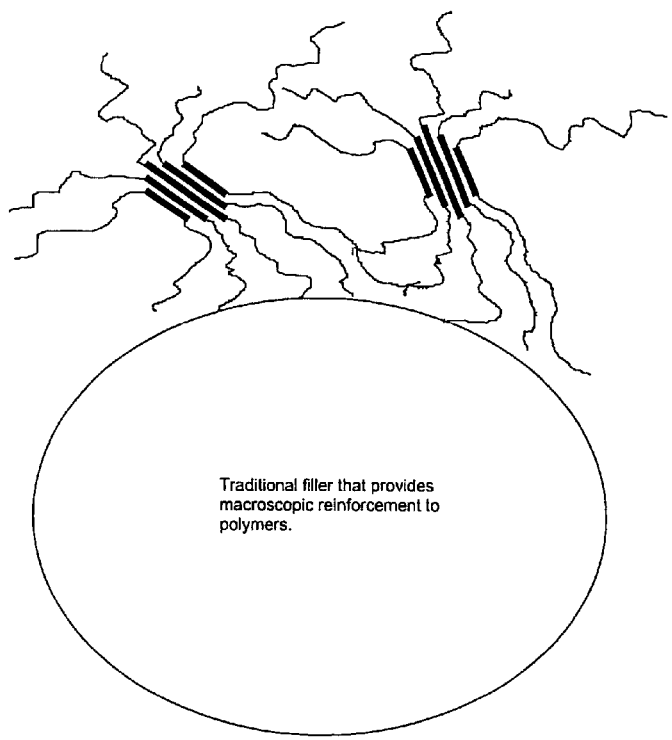
FIG. 4 illustrates the macroscopic reinforcement a traditional filler provides to polymers.

Nanostructured chemicals, such as the POSS Molecular Silicas illustrated in FIG. 3, are available as both solids and oils. Both forms dissolve in molten polymers thus solving the long-standing dispersion problem associated with traditional particulate fillers. Moreover, because POSS dissolves in plastics at the molecular level, the forces (i.e., free energy) from solvation/mixing are sufficient to prevent POSS from coalescing and forming agglomerated domains as occurs with traditional and other organofunctionalized fillers. Agglomeration of particulate fillers has been a problem that has traditionally plagued compounders and molders.

Table 1 below lists the size range of POSS relative to polymer dimensions and filler sizes. The size of POSS is roughly equivalent to that of most polymer dimensions, thus at a molecular level POS can effectively alter the motion of polymer chains.

TABLE 1

Relative sizes of POSS, polymer dimensions, and fillers.

| Particle Type | Particle Diameter |
| --- | --- |
| Amorphous Polymer Segments | 0.5–5 nm |
| Octacyclohexyl POSS | 1.5 nm |
| Random Polymer Coils | 5–10 nm |
| Colloidal Silica | 9–80 nm |
| Crystalline Lamellae | 1.0–9,000 nm |
| Fillers/Organoclays | 2–100,000 nm |

The ability of POSS to control chain motion is particularly apparent when POSS is grafted onto a polymer chain. See U.S. Pat. No. 5,412,053 to Lichtenhan et al., U.S. Pat. No. 5,484,867 to Lichtenhan et al, U.S. Pat. No. 5,589,562 to Lichtenhan et al. and U.S. Pat. No. 5,047,492 to Weidner, all expressly incorporated by reference herein. When POSS nanostructures are covalently linked to the polymer chain they act to retard chain motion and greatly enhance time dependent properties such as $T_g$, HDT, Creep and Set, which correlate to increased modulus, hardness, and abrasion resistance. The present invention now presents that similar property enhancements can be realized by the direct blending of nanostructured chemicals into plastics. This greatly simplifies the prior art processes.

Furthermore, because POSS nanostructured chemicals possess spherical shapes (per single crystal X-ray diffraction studies), like molecular spheres, and because they dissolve, they are also effective at reducing the viscosity of polymer systems. This benefit is similar to what is produced through the incorporation of plasticizers into polymers, yet with the added benefits of reinforcement of the individual polymer chains due to the nanoscopic nature of the chemicals (see FIG. 5). Thus ease of processability and reinforcement effects are obtainable through the use of nanostructured chemicals (e.g. POSS, POS) where as prior art would have required the use of both plasticizers and fillers or the covalent linking of POSS to the polymer chains. Additional benefit may be realized by the usage of nanostructured chemicals with monodisperse cage sizes (i.e., polydispersity=1) or from polydisperse cage sizes. Such control over compatibility, dispersability, and size is unprecedented for all traditional filler and plasticizer technologies.

EXAMPLES

General Process Variables Applicable to All Processes

As is typical with chemical processes there are a number of variables that can be used to control the purity, selectivity, rate and mechanism of any process. Variables influencing the process for the incorporation of nanostructured chemicals (e.g. POSS/POS etc.) into plastics include the size and polydispersity, and composition of the nanostructured chemical. Similarly the molecular weight, polydispersity and composition of the polymer system must also be matched with that of the nanostructured chemical. Finally, the kinetics, thermodynamics, and processing aids used during the compounding process are also tools of the trade that can impact the loading level and degree of enhancement resulting from incorporation of nanostructured chemicals into polymers. Blending processes such as melt blending, dry blending and solution mixing blending are all effective at mixing and alloying nanostructured chemical into plastics.

Example 1

Figure 6:
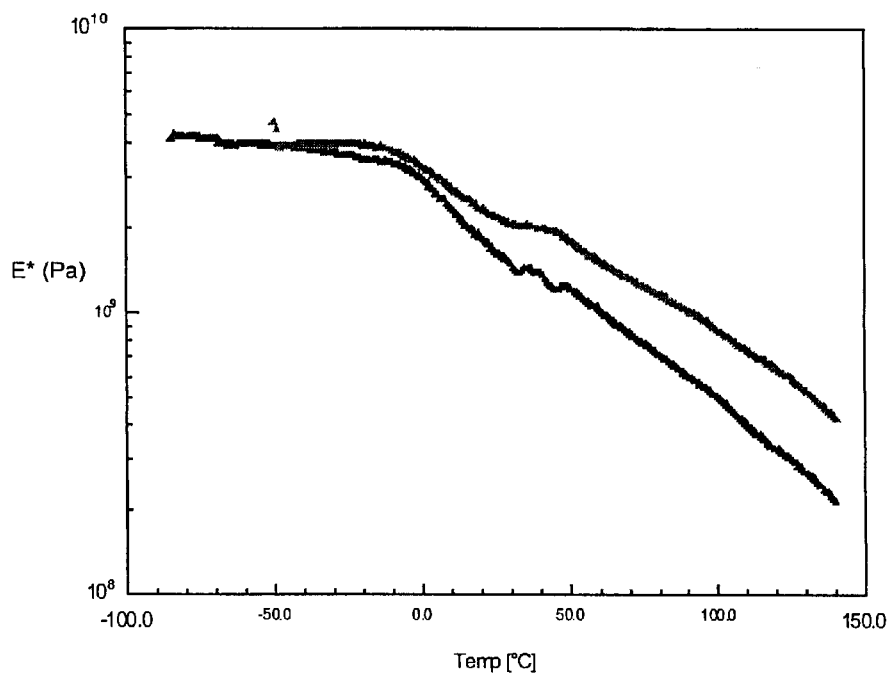
FIG. 6 is a graph of storage modulus (E*) relative to temperature (° C.) for nonreinforced polypropylene and POSS-reinforced polypropylene.
Figure 7:
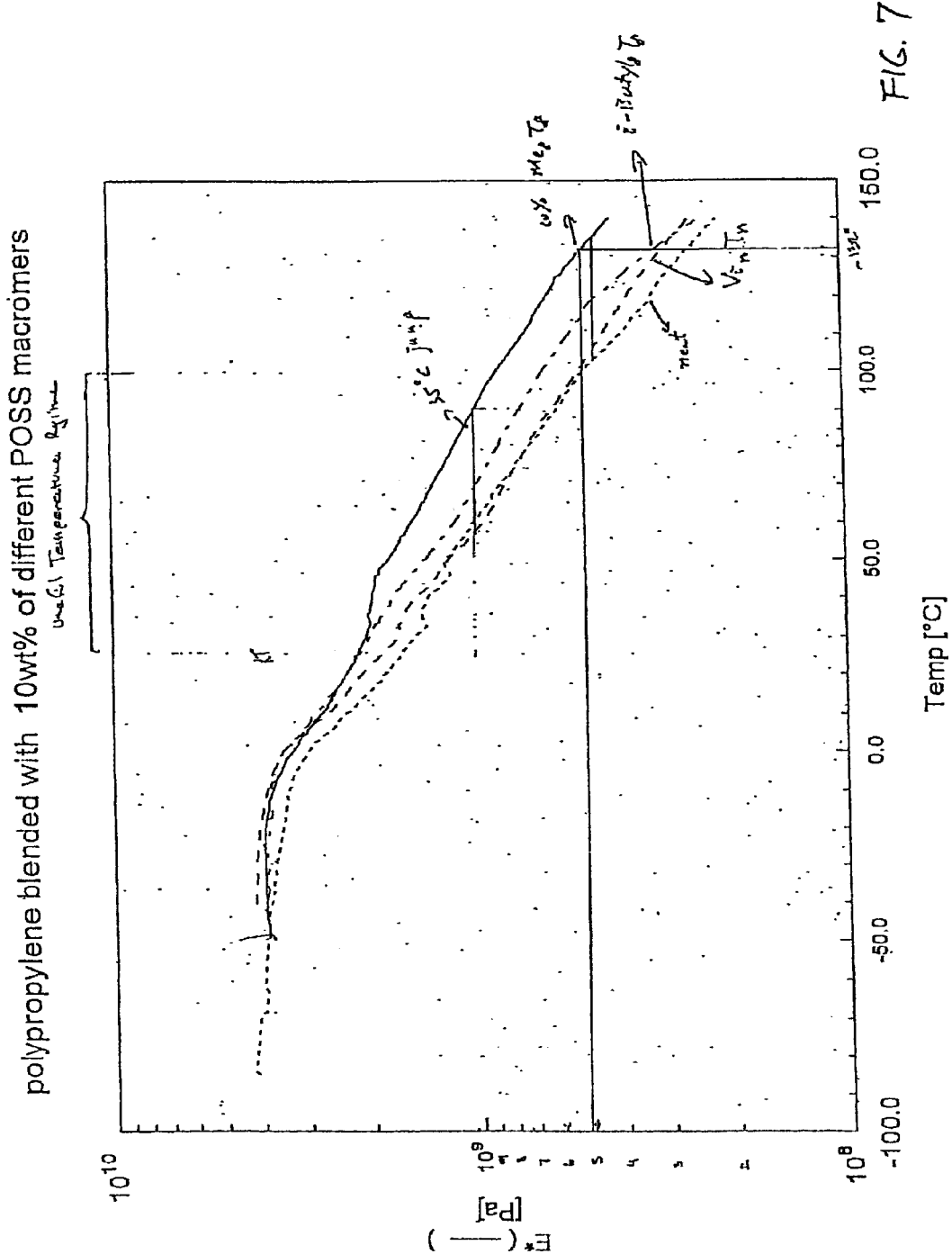
FIG. 7 is a graph of storage modulus (E*) relative to temperature (° C.) for nonreinforced polypropylene and for three other POSS-reinforced polypropylenes alloyed with 10 wt. % of Octamethyl POSS $[(CH_3SiO_{1.5})_8]\Sigma_8$, 10 wt. % of Octavinyl POSS $[(CH_2CHSiO_{1.5})_n]\Sigma_n$-tech grade (n=8–12), and with 10 wt. % of Octaisobutyl POSS $[((CH_3)_2CHCH_2SiO_{1.5})_8]\Sigma_8$ respectively.

A series of Nanostructured POSS Chemicals were compounded into molding grade polypropylene at the 10 wt. % level using a twin screw extruder operating at 80–120 rpm and 190° C. Both POSS and the polymer were dried prior to compounding to ensure a maximum state of alloying. After compounding, the POSS-reinforced samples were then molded into discs, dogbones and other test specimens and subjected to analysis and characterization. The viscoelastic response as represented by the values for storage modulus (E*) relative to temperature (° C.) of the POSS-reinforced polypropylene is shown in FIG. 6.

Various sizes of POSS molecular silicas were observed to have a pronounced effect on the degree to which the modulus was retained at elevated temperatures. The POSS Molecular Silicas were Octamethyl POSS [$(CH_3SiO_{1.5})_8$] $\Sigma_8$, Octavinyl POSS [$(CH_2CHSiO_{1.5})_n$]$\Sigma_n$-tech grade which contains a distribution of nanostructure sizes, and Octaisobutyl POSS [$((CH_3)_2CHCH_2SiO_{1.5})_8$]$\Sigma_8$, which is the largest nanostructure of the three. Overall it was observed that the Octamethyl POSS [$(CH_3SiO_{1.5})_8$]$\Sigma_8$ was most effective at retaining the modulus at elevated temperatures. The fracture toughness and other mechanical properties of the POSS-alloyed polypropylene were also noticeably improved. The mechanism for this enhancement was observed to be the restriction of the motion of the crystallites and subsequent polymer chains in the semi-crystalline polypropylene (see FIG. 5). Similar levels of enhancement have been observed for other semicrystalline polymers (e.g. polyethylene, nylon, ABS, SAN, SBS, polyethers, polysulfones, and polyimides etc.), amorphous polymers (e.g., polystyrene, polysiloxane, polymethylmethacrylate, and polyester, etc.), crystalline polymers (e.g., liquid crystals, etc.), and rubber.

Example 2

Nanostructured POSS [$(CH_3SiO_{1.5})_8$]$\Sigma_8$ was compounded into isotactic polypropylene (iPP) in the amounts of 2%, 5%, and 10% [$(CH_3SiO_{1.5})_8$]$\Sigma_8$, and various physical properties (tensile strength, flexural modulus, HDT, and izod impact) of the alloyed iPP were measured and compared with the same physical properties of the base iPP. Table 2 below illustrate these data, which are average of at least 10 samples with acceptable deviation of 5% or better. The enhanced properties of POSS-reinforced iPP are apparent. Similar levels of enhancements were observed for other polymers.

Figure 5:
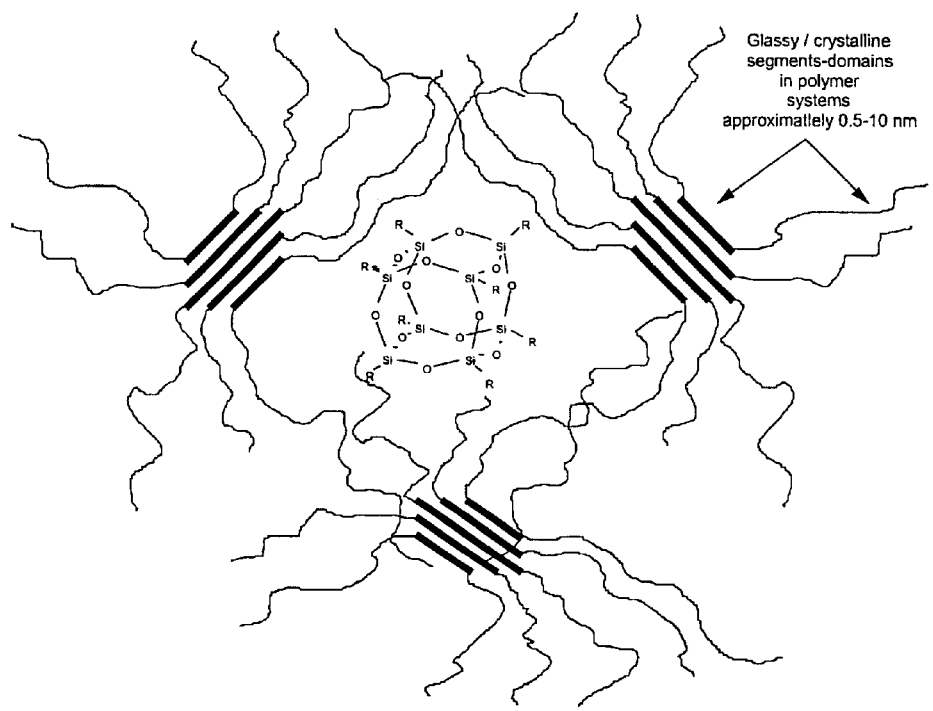
FIG. 5 illustrates a nanoreinforced polymer microstructure.

The mechanism for these enhancements is attributed to the restriction of motion of the crystallites and subsequent polymer chains in the semi-crystalline polypropylene (see FIG. 5). It should be further noted that alloying the iPP did not alter the degree of crystallinity of the base resin.

TABLE 2

|  | Neat iPP (processed) | iPP + 2% [(CH$_3$SiO$_{1.5}$)$_8$]Σ$_8$ | iPP + 5% [(CH$_3$SiO$_{1.5}$)$_8$]Σ$_8$ | iPP + 10% [(CH$_3$SiO$_{1.5}$)$_8$]Σ$_8$ |
|---|---|---|---|---|
| Tensile Strength @ Yield; ASTM D638 | 4800 psi (33.0 MPa) | 5000 psi (34.5 MPa) | 5100 psi (35.1 MPa) | 5200 psi (35.8 MPa) |
| Flexural Modulus (0.05 in/min, 1% secant); ASTM D790A | 235,000 psi (1.62 GPa) | 251,000 psi (1.73 GPa) | 255,000 psi (1.76 GPa) | 262,000 psi (1.80 GPa) |
| HDT @ 66 psi, as injected; ASTM D648 | 210° F. (99° C.) | 221° F. (105° C.) | 239° F. (115° C.) | 255° F. (124° C.) |
| Izod Impact @ 25° C. ASTM D256A | 0.55 ft-lb/in | 0.55 ft-lb/in | 0.62 ft-lb/in | 0.75 ft-lb/in |

Example 3

Figure 8:
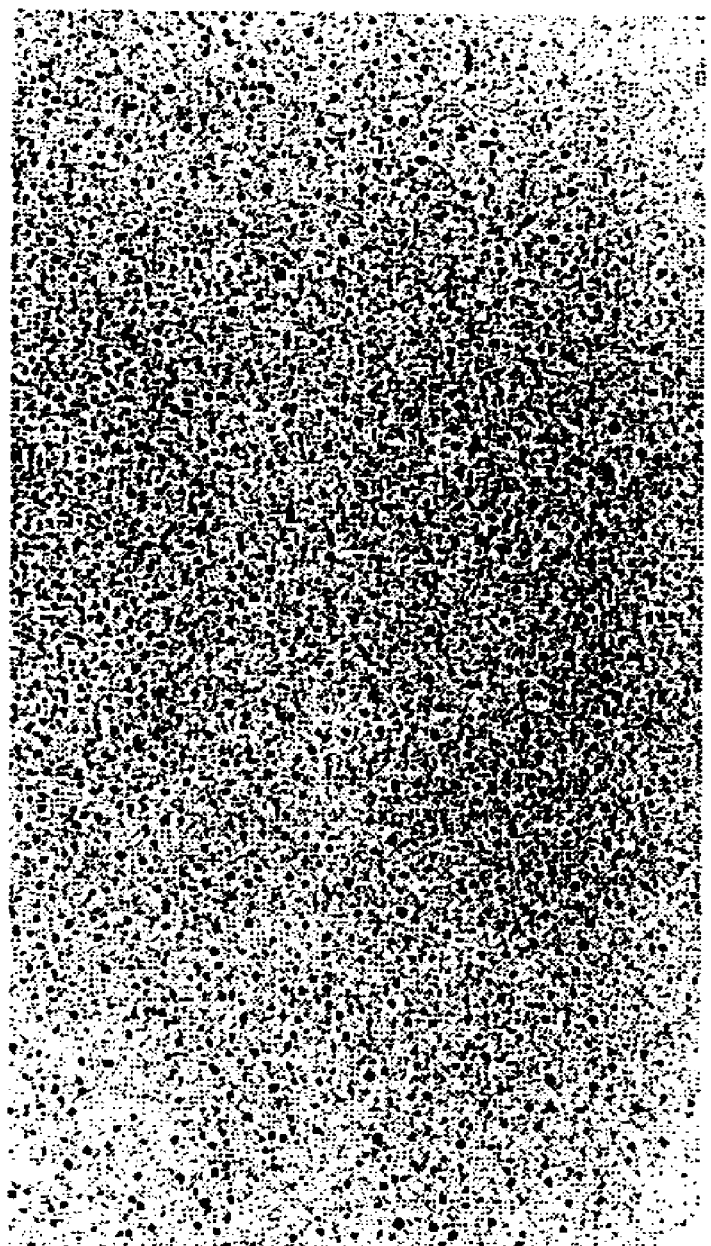
FIG. 8 is a transmission electron micrograph of a fiber spun from a nanoreinforced isotactic polypropylene (iPP+ 10% $[(CH_3SiO_{1.5})_8]\Sigma_8$).

A transmission electron micrograph was taken of a fiber that was spun from the nanoreinforced alloy (iPP+10% [(CH$_3$SiO$_{1.5}$)$_8$]Σ$_8$) (see FIG. 8), which illustrates the molecular level dispersion that can be achieved in polymers via compounding. Specifically, the black dots in FIG. 8 represent Molecular Silica™ dispersed at the 1 nm to 3 nm level and the black scale bar represents 50 nm.

What is claimed is:

1. A method of alloying a nanostructured chemical selected from the group consisting of POSS and POS into a polymer selected from the group consisting of acrylics, carbonates, epoxies, esters, silicones, styrenics, amides, nitriles, olefins, aromatic oxides, aromatic sulfides, and ionomers or rubbery polymers derived from hydrocarbons and silicones, comprising the step of non-covalently compounding the nanostructured chemical into the polymer via nonreactive blending.

2. A method according to claim 1, wherein a physical property of the polymer is improved as a result of alloying the nanostructured chemical into the polymer.

3. A method according to claim 2, wherein the physical property comprises a property selected from the group consisting of adhesion to a polymeric surface, adhesion to a composite surface, adhesion to a metal surface, water repellency, density, low dielectric constant, thermal conductivity, glass transition, viscosity, molecular motion, melt transition, storage modulus, relaxation, stress transfer, abrasion resistance, fire resistance, biological compatibility, gas permeability, porosity, and optical quality.

4. A method according to claim 2, wherein the nanostructured chemical functions as a plasticizer.

5. A method according to claim 2, wherein the nanostructured chemical functions as a filler.

6. A method according to claim 2, wherein the nanostructured chemical functions as both a plasticizer and a filler.

7. A method according to claim 3, wherein a time dependent property is enhanced as a result of compounding the nanostructured chemical into the polymer to control molecular motion.

8. A method according to claim 7, wherein the time dependent property is selected from the group consisting of $T_{gl}$, HDT, modulus, creep, set, and permeability.

9. A method according to claim 2, wherein a selected region of a polymer is reinforced by compounding and the nanostructured chemical has chemical properties compatible with the selected region of the polymer.

* * * * *